United States Patent
Slack

[11] 3,841,344
[45] Oct. 15, 1974

[54] GAS MIXING SYSTEMS
[75] Inventor: Don S. Slack, Costa Mesa, Calif.
[73] Assignee: Airco, Inc., New York, N.Y.
[22] Filed: June 6, 1973
[21] Appl. No.: 367,599

[52] U.S. Cl. ................. 137/88, 137/7, 137/606
[51] Int. Cl. ................. G05d 11/03, F16k 19/00
[58] Field of Search .................... 137/7, 88, 606

[56] References Cited
UNITED STATES PATENTS
| | | | |
|---|---|---|---|
| 3,515,155 | 6/1970 | Haffner et al. | 137/7 |
| 3,677,296 | 7/1972 | Berger | 137/606 |
| 3,739,799 | 6/1973 | Bickford | 137/88 |

*Primary Examiner*—Robert G. Nilson
*Attorney, Agent, or Firm*—Roger M. Rathbun; Edmund W. Bopp; H. Hume Mathews

[57] ABSTRACT

A gas mixing system wherein a supply line is provided for each of the two or more gases to be mixed. Dome-loaded regulators are provided in each supply line upstream of mixer metering valves and are controlled by a common control pressure. The output pressure of these regulators is substantially the same as the control pressure. In the event the regulator outlet pressure becomes less than the control pressure applied thereto, a poppet automatically opens to allow supply gas to flow into the regulator to increase the outlet pressure to equalize the outlet pressure and the control pressure. In the event the regulator outlet pressure is greater than the control pressure, another poppet automatically opens to vent the excess outlet pressure to atmosphere to again cause an equalization of the outlet pressure and the control pressure. A downstream regulator controls the back pressure in a mixing chamber where the gases from the mixer metering valves are combined, and the downstream regulator is loaded by the same control pressure that controls the upstream regulators. The downstream regulator responds to changes in the control pressure, yet inlet pressure on the downstream regulator is maintained at a set predetermined pressure below the control pressure to insure a constant pressure differential at all times across the metering valves. An adjustable pressure switch in the system actuates a solenoid valve to fill an accumulator tank when the accumulator pressure drops to a first level below upstream pressure, and secures the valve when the accumulator pressure reaches a second level below upstream pressure. All control pressures are provided by a single system regulator, which may be set in accordance with system requirements.

14 Claims, 4 Drawing Figures

GAS MIXING SYSTEMS

BACKGROUND OF INVENTION

This invention relates generally to a system for mixing different gases in controlled proportions, and more specifically relates to a system of this type which provides accurate and dependable regulated pressures.

In U.S. Pat. No. 3,515,155 to M. P. Haffner and G. R. Spies, which patent is assigned to the assignee of the instant invention, there is disclosed a gas mixture proportioner system of the same general type to which the instant invention appertains, the present invention being basically an improvement upon the said patented system. In that patented system a supply line is provided for each gas and metering valves are connected in each supply line, with the rate of flow through the different supply lines being controlled to obtain the desired proportions at a mixing chamber. The pressure upstream of the metering valves are regulated by pressure regulators in each line which are domeloaded by gas provided from one of the supply lines. The back pressure on the downstream side of the metering valves and mixing chamber is maintained to keep the lower metering pressure constant by means of a spring-loaded regulator setable by the operator to provide 75 to 100 psi pressure downstream of the metering valves, below the upstream pressures. This, however, requires close attention by the operator and accurate, well-calibrated gauges.

The aforementioned patented system also utilizes a pressure responsive switch connected on the downstream side of the back pressure control valve, the function of which is to open and close circuits in accordance with variations in the gas pressure in the accumulator tank. The said pressure switch is however, preset, which therefore limited the system to operating at but a single pressure. This feature also required the operator to accurately set upstream pressure to correspond with the pressure switch setting.

In accordance with the foregoing, it may be regarded as an object of the present invention to provide a gas mixing system of simplified design, construction and operation, which permits operation over a wide pressure range, and which requires adjustment of but a single system regulator in order to accurately control pressures throughout the system, with the remaining pressure control valves being self-adjusting in consequence of the selected setting.

SUMMARY OF INVENTION

Now in accordance with the present invention, the foregoing objects, and others as will become apparent in the course of the ensuing specification, are achieved in a gas mixing system wherein a supply line is provided for each of the two or more gases which are to be mixed. A dome-loaded type regulator is provided in each line upstream of the mixer metering valves. If the pressures at these regulator outlets are less than the control pressure applied thereto, poppets in the said valves open to allow supply gas to flow in and equalize pressure. If the regulated pressure is greater than the control pressure another poppet opens, allowing the regulated pressure to vent off to atmosphere. A tracking relief valve is thus used to prevent excessive regulated pressure buildup. A downstream regulator controls pressure downstream of the metering valves, and is loaded by the same pressure as controls the upstream pressure. Consequently the pressure differential across the metering valves is always maintained at the proper setting without the need for operator attention, or accurate gauges, and regardless of upstream pressure setting. The control pressure referred to is provided by a single regulator, which thus provides control pressure for both downstream and upstream regulators. An adjustable pressure switch in the system actuates a solenoid valve to fill an accumulator tank when the accumulator pressure drops to a selected level below upstream pressure, and secures the valve when the accumulator pressure reaches a second selected level below upstream pressure. The switch is loaded, and thus set, by upstream control pressure from the system regulator; consequently the mixer can operate at any pressure by merely setting the system regulator.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
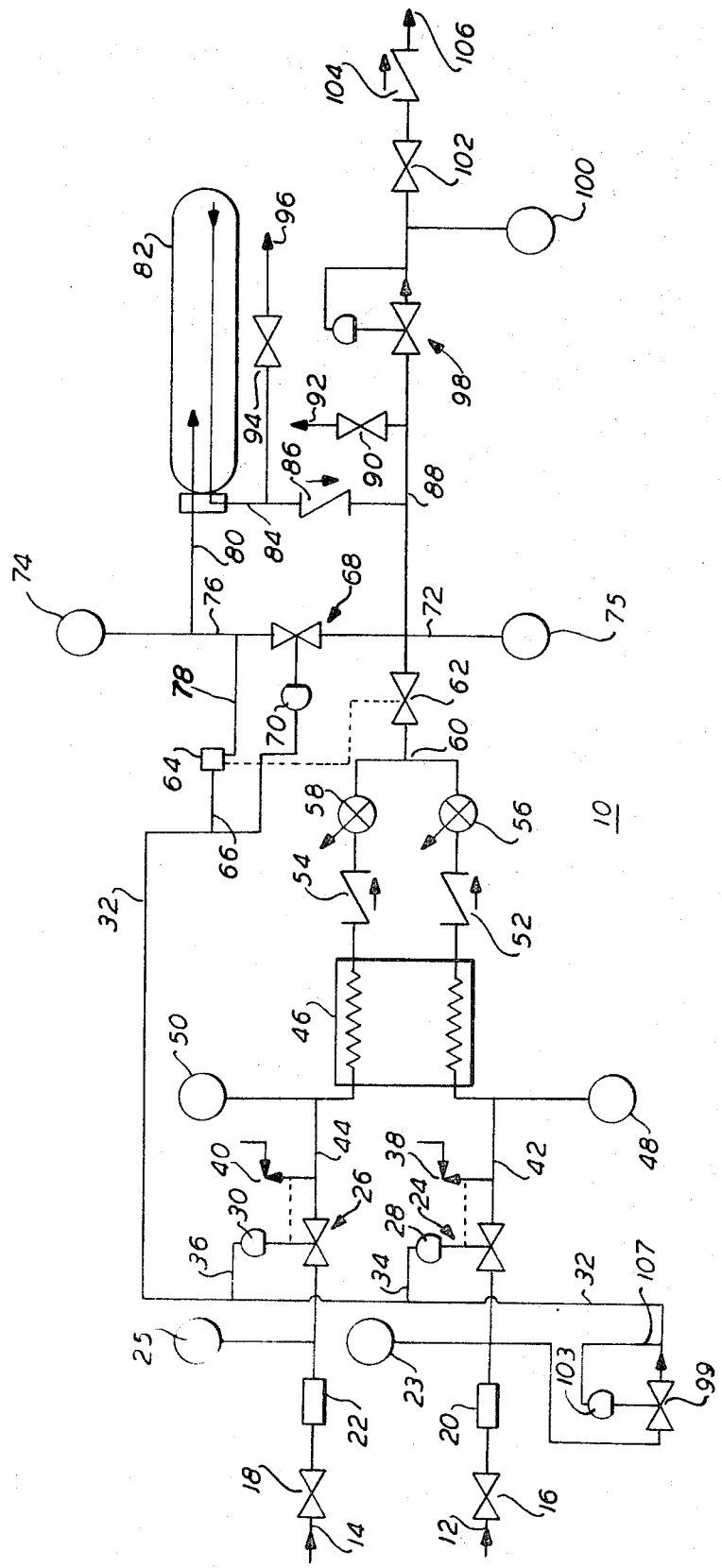
FIG. 1 is a schematic flow diagram for a mixing system in accordance with the present invention.

In FIG. 1 an overall flow schematic is shown for a gas mixing system 10 in accordance with the present invention. The present system, as is known in the art, may be used for various purposes as, for example, for obtaining desired proportions of different gases for use in chemical processes, for supplying breathing atmospheres of desired compositions, etc. The system 10 can include a pair of gas supply lines 12 and 14, which may respectively be considered as supplying helium and oxygen from sources such as storage cylinders. Although the system is representatively shown as including but a pair of said gas lines, three or more lines may also be utilized, depending upon the requirements of a given application. The gases in their respective lines, initially pass through shut-off valves 16 and 18, which can be manually or other operated. Thereafter such gases pass through the respective line filters 20 and 22 with gauges 23 and 25 being provided beyond the filters.

There is next positioned in each of the said lines 12 and 14, upstream regulators, respectively identified at 24 and 26. Each of these regulators are gas-loaded by domes shown at 28 and 30; gas for loading the said domes is provided through the control line 32 via the connecting lines 34 and 36. Relief valves are provided at 38 and 40 for each of the upstream regulators 24 and 26. The regulators will be set forth in greater detail in the description of FIG. 2 hereinbelow.

Beyond upstream regulators 24 and 26, the respective gases proceed through lines 42 and 44 through the heater 46, with gauges 48 and 50 enabling the pressures upstream from the heater to be determined. Beyond the heater 46 a pair of check valves 52 and 54 are provided just before the mixer metering valves 56 and 58. The two lines thereupon join at a confluence 60, whereat a mixing chamber may be provided, if desired. On the downstream side of the confluence 60 a solenoid-actuated valve 62 is provided. The solenoid for valve 62 is activated by a pressure responsive switch 64, which has a control pressure input provided thereto via the line 66 proceeding from line 32. Switch 64 will be discussed in further detail hereinbelow, in connection with the showing of FIG. 4. When the valve 62 is open, pressure is provided to downstream (back pressure) regulator 68. The latter (which will be discussed more fully in connection with the description of FIG. 3) is regulated by the dome 70, in turn provided with a control pressure input from line 32. A gauge 74 is present at the output side of downstream regulator 68, more specifically in the output line 76 therefrom; with a similar gauge 75 being provided at input line 72. The pressure responsive switch 64 previously referred to, is also seen to be connected to line 76 via a line 78. Valve 62 accordingly regulates feed of gas via line 80 to accumulator tank 82.

Gas proceeding from accumulator tank 82 via line 84 and check valve 86 thence proceeds to main feed delivery line 88, which is also connected to the output from valve 62. A manual shut-off valve 90 and sampling tap 92 are taken off of line 88 to enable sampling, if desired, of the gas. A similar shut-off valve 94 and tap 96 are positioned at the tank side of the check valve 86. A pressure regulator valve 98 is then provided for line 88 in order to reduce the supply pressure with a gauge 100 indicating the pressure beyond said valve. Finally, a manual shut-off valve 102 and check valve 104 are in line in the main delivery conduit with the gas supply being taken beyond such elements at point 106.

A system control regulator 99 is provided, for controlling pressures throughout the present system. This regulator 99 has a gas input thereto from one of the gas input lines, representatively shown as the helium line 12, via the line 101. Regulator 99 has its output to the common control line 32, with a conventional feedback path for the dome 103 being provided through line 107. The regulator 99 is settable in accordance with the dictates of an operator of the present system, and once the said regulator is adjusted as desired, provides control pressures for the upstream regulators 24 and 26, the downstream regulator 68, and thus as well for the accumulator 82 pressure. Thus, it is seen that a single regulator 99 enables control of all pressures and valve operating points throughout the present system 10.

Figure 2:
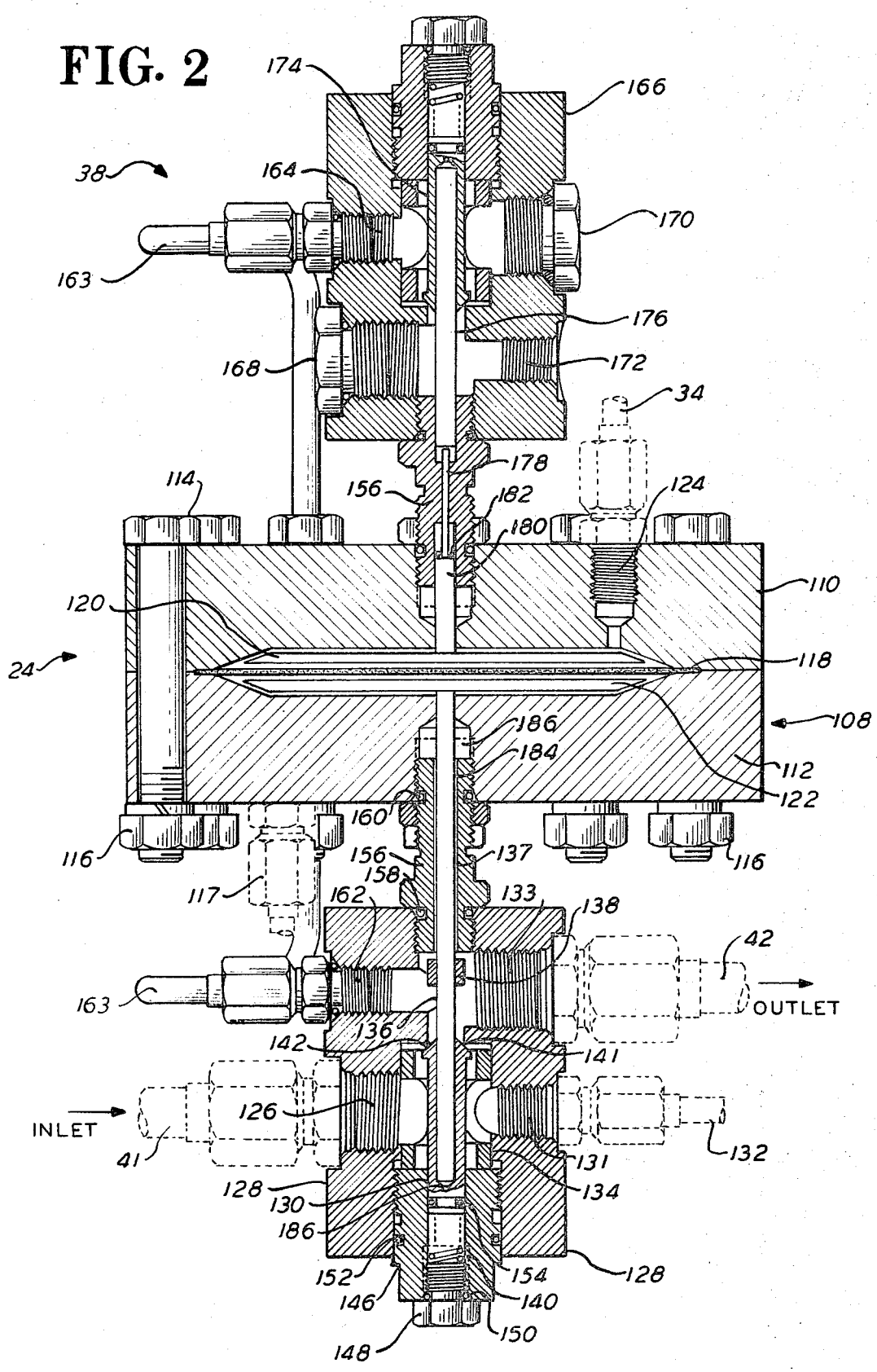
FIG. 2 is a vertical cross-sectional view through one of the upstream pressure regulators of the FIG. 1 system.

In FIG. 2 herein a vertical cross-sectional view appears through the upstream regulator 24 of FIG. 1 herein. Regulator 24 is seen to include a regulator cap 108, divided into upper and lower portions 110 and 112, which portions are joined by hex-head bolts 114 which pass through the portions and are secured by hex-head nuts 116. A regulator diaphragm 118, of rubber or the like, is clamped between portions 110 and 112, and spaced from upper and lower diaphragm plates 120 and 122. Control pressure from line 32 in FIG. 1 is applied to the upper side of diaphragm 118 via the port 124, through the line 34. Gas flowing to regulator 24 proceeds via line 41, and enters the space 126 within regulator valve body 128. A port 131 is provided to which a gauge may be connected, as by the line 132, to monitor the pressure in space 126. A gauge 117 may also be connected to monitor the pressure below diaphragm 118. The regulator outlet, corresponding to line 42 in FIG. 1, is seen to be connected to the space 133.

A lower poppet 130 is vertically movable in a sleeve 134 by means of the push rod 136 which is secured to lower diaphragm plate 122. A collar 138 is secured about the push rod 136, and limits the movement thereof. It will be evident that when the diaphragm moves in a downward direction it will force a downward movement of the diaphragm plate 122 acting against the bias provided by spring 140; lower poppet 130 moves in a downward direction which displaces the face 141 of the poppet away from the knife-edge valve seat 142. Upon such occurring, a gas path is provided between spaces 126 and 133, thereby providing flow of gas from the inlet at 41 to the outlet at 42. The poppet springs, etc. are maintained within valve body 128 by retainer 146, and hex-head plug 148, with O-rings being provided at 150, 152 and 154 to appropriately seal the bottom of the unit. A connector 156 connects the valve body to the regulator cap, with the push rod 136 passing therethrough, and with appropriate O-ring seals being provided at 158 and 160.

The relief valve 38 or 40 (of FIG. 1) constitutes the upper portion of the regulator 24. In particular it is seen that a port 162 is provided in regulator valve body 128 with a line 163 leading from such port to the relief valve 38, and entering such at the port 164 of relief valve body 166. The latter is again seen to be connected to the regulator cap via a regulator connector 156, identical to the similarly numbered element below the regulator cap, with corresponding seals being utilized. In most respects the relief valve body 166 and related elements are similar to the regulator valve body 128. It will be noted, however, that a pair of hex-head plugs 168 and 170 close non-utilized ports in the relief valve body 166. Furthermore, a venting port 172 is provided for purposes to be shortly set forth. An upper poppet 174, similar to the lower poppet 130 previously discussed, is mounted for corresponding vertical movement by means of the push rods 176, 178 and 180, the latter being connected to upper diaphragm plate 120. An O-ring seal 182 is provided about push rod 178. Both lower poppet 130 and upper poppet 174 have inner diameters which exceed the outer diameters of the respective push rods as, for example, the push rod 136 in the case of the lower poppet. Referring for exemplification to such lower poppet it will thus be clear that an annular gas flow space, not apparent on the drawing scale, is provided between space 133 and the small opening 186 provided at the bottom of the poppet. This annular gas flow space is for the purpose of providing balanced regulation at both ends of the movable poppet, as is known in the art; that is to say, that the pressure may thus be equalized at both ends. As indicated, the same feature is present with respect to the upper poppet 174.

The operation of upstream regulator 24 may now be set forth. In particular, it will be evident from the foregoing that control pressure is applied to the upper side of diaphragm 118, with regulated pressure being applied at the lower side thereof via the space 184 about push rod 136, space 186, and a passage connecting to space 186 and not seen in the plane of the diagram. If the regulated pressure at outlet 42 is less than the control pressure, diaphragm 118 moves in a downward direction, opening lower poppet 130, thereby allowing additional supply gas to flow from the inlet to the outlet, to increase the pressure beneath diaphragm 118 so that it equalizes the control pressure above diaphragm 118. If, on the other hand, the regulator pressure, i.e. beneath diaphragm 118, is greater than the control pressure, i.e. above diaphragm 118, it will be evident that diaphragm 118 moves in an upward direction, thereby opening upper poppet 174. Upon this happening, gas may flow via the line 163 into the relief valve body 166, thence proceeding downwardly from space 164 through the open valve seat provided by upward movement of poppet 174. The said gas may then proceed outwardly through vent port 172 which decreases the pressure beneath the diaphragm 118 until the pressures on either side of diaphragm 118 are again equilized. The net result of the movement of poppet 174 is to thus provide a tracking relief valve, which prevents excessive regulated pressure buildup, in the event of seal leakage, or in the event the control pressure is decreased. It will be further appreciated that in general the relief valve 38 (which includes relief valve body 166, poppet 174, and the several other components lying above upper portion 110) uses components identical with that part of the regulator 24 which is below lower portion 112, thus reducing the number of components in the regulator.

Figure 3:
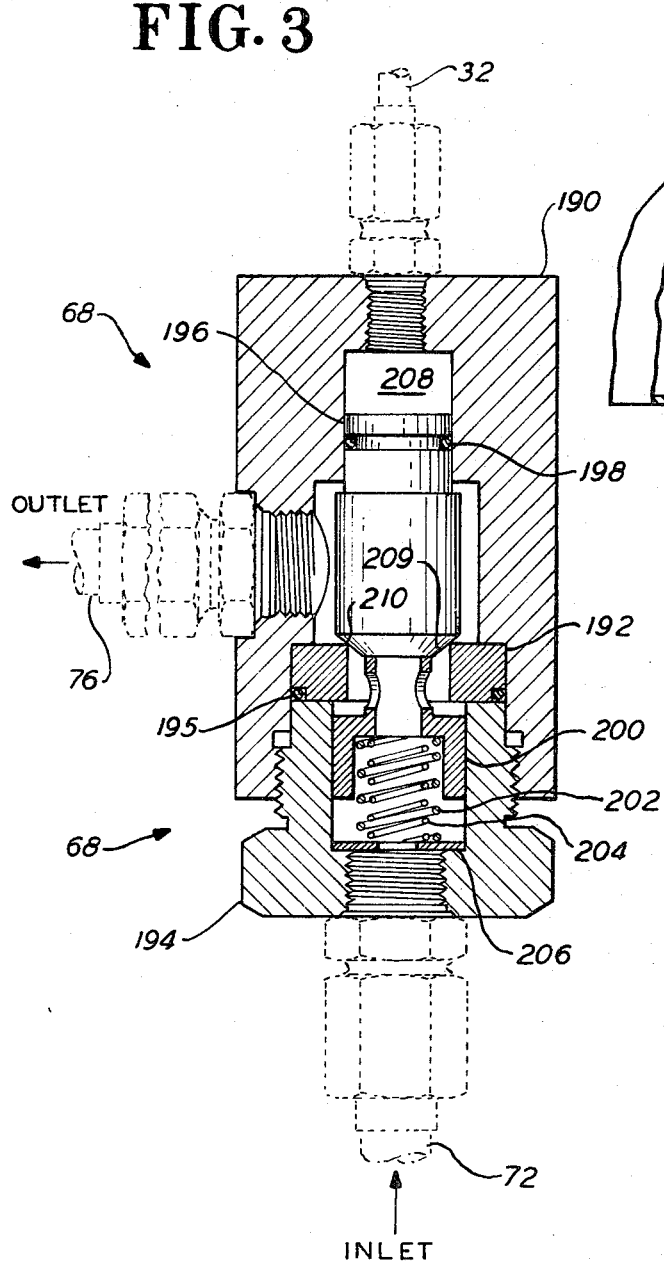
FIG. 3 is a vertical cross-sectional view through the downstream pressure regulator of the present system.

The downstream regulator 68 (FIG. 1) is shown in the detailed vertical cross-sectional view of FIG. 3 herein. As seen in that view, and in correspondence to FIG. 1, the inlet appears at 72 and outlet line at 76. Similarly, the control pressure line appears at 32. The downstream regulator 68 is seen to comprise a regulator body 190, in which a regulator seat 192 is mounted, and held in the body by a retaining nut 194 threaded into the lower portion thereof, with an O-ring 195 being therebetween. A poppet 196 is mounted for vertical movement within the body 190, the upper portion of the poppet being sealed by an O-ring 198 from the adjacent internal wall of body 190. The bottom of poppet 196 bears against a spring guide 200, which in turn bears against a pair of springs 202 and 204, which rest upon spring retainer 206. The said springs 202 and 204 bias poppet 196 in an upward direction, against the force provided at the upper face of the poppet by the dome-loading pressure provided through line 32 into space 208.

In the operation of regulator 68, the poppet 196 has an inclined face 209 which seals against regulator seat edge 210. The poppet 196 moves upwardly away from seat edge 210 whenever the force against the bottom area of poppet 196 arising from the inlet pressure plus the combined force provided by springs 202 and 204 is greater than the force acting downwardly on the upper area of the poppet 196 arising from the control pressure acting thereon. By thereby selecting springs 202 and 204 having known spring constants and by knowing the area of the top and bottom surfaces of the poppet 196, the regulator 68 can readily be constructed such that the regulated pressure at the inlet can always be maintained at a predetermined pressure below the control pressure, preferably about 75 psi below the control pressure. In this manner, the control pressure can be changed, yet the inlet pressure of the downstream regulators will always be at a set, predetermined pressure below the control pressure, i.e. 75 psi without the need for operator attention thus assuring a constant back pressure to confluence and metering valves.

Figure 4:
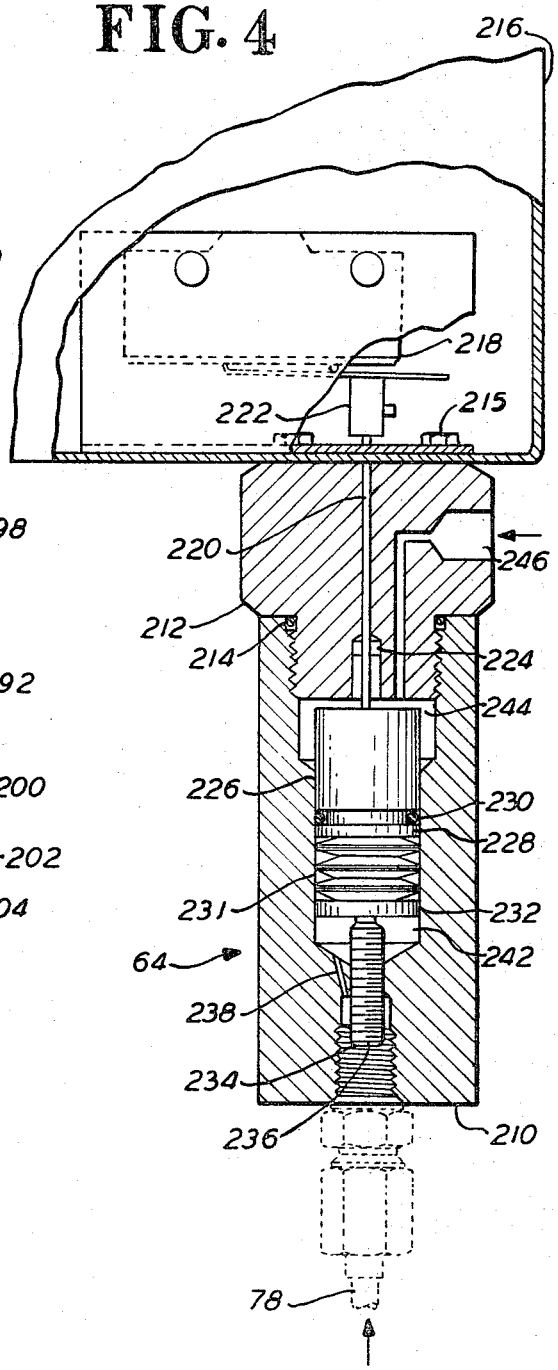
FIG. 4 is a vertical cross-sectional view through the pressure-responsive switch utilized in accordance with the invention.

In FIG. 4 a vertical cross-sectional view appears through the pressure switch 64. The switch is seen to include a body 210, which receives the pressure input from accumulator 82 via the line 78, already referred to in connection with FIG. 1. A cap 212 is threadingly received into the top portion of body 210 with a seal being provided by an O-ring 214. Hex-head screws 215 secure cap 212 to an electrical box 216, in which is mounted a conventional microswitch 218. The microswitch 218 is actuated in a conventional manner by a piston rod 220 which is passed through a piston sleeve 222, and bears against a suitable arm for the microswitch. The said piston rod is seen to also pass through cap 212 and a packing 224, and thence be joined to a piston 226, which is sealed from the wall of piston chamber 228 by an O-ring 230.

A spring 231, serving as a mechanical biasing force bears against the lower face of piston 226, and is compressed at its lower end by a spring retainer 232. An adjustable set screw 234, in turn bears against spring retainer 232; the lower end 236 of the said set screw 234 is accessible for adjustment, whereby the biasing force provided against spring 231 may be adjusted as desired. The sensed accumulator pressure is introduced by line 78 at the port 236. The said pressure thereupon proceeds through the passageway 238, and thence enters the space 242 beneath the piston. The space 244 at the upper end of the piston is further seen to be accessible to the input port 246 at which control pressure is applied; more specifically the input to port 246 is from lines 32 and 66 as seen in FIG. 1. It will therefore be apparent that the present switch 64 is pressure loaded and thus controlled by control pressure from the regulator 99 (FIG. 1). The bias spring 231 is set such that switch 64 opens solenoid valve 62 when accumulator pressure is typically about 200 psi below the control pressure and closes solenoid valve 62 at about 100 psi below the control pressure. It will, of course, be apparent that the present mixing system can operate at any pressure by merely setting the system regulator 99.

In the operation of the gas mixing system, it may be seen that the operator may control various pressures throughout the system by single system control regulator 99.

As the system is operated, the supply gases enter through shutoff valves 16 and 18 to the upstream regulators 28 and 30. The operator, by adjusting the system control regulator 19, sets the pressure which the upstream regulators 30 and 28 regulate for the supply gases. As will be noted, in the preferred embodiment the upstream regulators 28 and 30 are designed such that the output pressure of the supply gases from the upstream regulators is the same pressure as that which the operator sets as the control pressure in control line 32 by the system control regulator 99. The supply gases are then passed through the heater 46, check valves 52 and 54 and are proportioned in accordance with the settings of the mixer metering valves 56 and 58. The mixture is formed within mixing chamber or confluence 60 and enters solenoid valve 62. A downstream backpressure regulator 68 sets a predetermined backpressure of the mixed gases and is also controlled by the control pressure set by the system control regulator 99. The backpressure regulator is, as explained, dome loaded by the control pressure, however, its design maintains its inlet pressure at a set predetermined pressure below that control pressure. Generally the downstream regulator 68 is set to maintain an inlet pressure at about 70 psi below the control pressure and, therefore, a constant pressure differential is maintained at all times across the metering valves. As an example, when the operator decides to change the main gas pressures through the system, the system control regulator 99 is adjusted. By varying the system control regulator 99, the main gases pressure at the outlet of upstream regulators 28 and 30 is thereby varied accordingly and, in addition, the control pressure also adjusts the backpressure regulator 68 to automatically maintain a 70 psi differential or backpressure in the system between the inlet of the backpressure regulator 68 and the main gases pressure from upstream regulators 28 and 30.

The accumulator 82 operates in a conventional manner, however, its pressure is regulated with respect to the control pressure by a pressure responsive switch 64 which turns the solenoid valve 62 on and off in accordance with the range of the pressure sensed in accumulator 82. For instance, the switch 64 may be set to turn the valve 62 on when the pressure in the accumulator has reached a point about 200 psi below the control pressure and the switch 64 will turn the solenoid valve 62 off when the pressure in the accumulator has increased to about 100 psi below the control pressure.

In this manner the system control regulator 99 may be adjusted to establish the control pressure which thereafter sets the main gases pressure from the outlet of upstream regulators 28 and 30, the control pressure maintains a constant backpressure in the system across the metering valves and maintains, by switch 64, the pressure within the accumulator 82 to within a certain range of pressure below the control pressure. Accordingly, once the control regulator 99 is set or adjusted, the other critical pressures within the system are automatically set by that control pressure and it is not necessary to make individual adjustments to establish a certain backpressure or to establish a specific range of pressures within the accumulator 82.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly, the invention is to be broadly construed and limited by the scope and spirit of the claims now appended hereto.

I claim:

1. A gas mixing system, comprising in combination:

a plurality of supply lines for different gases;
   a metering valve in each supply line;
   a confluence downstream of said metering valves, whereat said individual gases are mixed;
   a controllable pressure regulator, positioned in each line upstream of said metering valve;
   a delivery line, for supplying mixed gas from said confluence to a utilization point;
   a controllable back pressure regulator, positioned downstream of said confluence, to thereby control back pressure across said metering valves;
   an accumulator tank adapted to receive and contain a portion of the mixed gases;
   a pressure responsive switch connected to control the pressure in said accumulator tank by controlling feed of the mixed gases from said confluence to said tank to maintain said pressure in said accumulator tank within selected limits; and
   control means connected to commonly control upstream pressure regulators and said back pressure regulator.

2. A system in accordance with claim 1, wherein said control means is further connected to commonly control said pressure responsive switch.

3. A system in accordance with claim 2 wherein said control means is connected to provide a common control pressure to provide control for said upstream pressure regulators, said back pressure regulator and said pressure responsive switch.

4. A system in accordance with claim 3, wherein said control means for providing a common control pressure comprises a single system regulator, providing said common control pressure by a common output line connected to said upstream and downstream regulators, and to said pressure responsive switch.

5. A system in accordance with claim 4, wherein said system regulator derives its input from one of said gas supply lines.

6. A system in accordance with claim 4 wherein said back pressure regulator is dome controlled by the control pressure and is adapted to maintain its inlet pressure at a predetermined pressure below the control pressure.

7. A system in accordance with claim 4 wherein said upstream pressure regulators are dome controlled by the control pressure and are adapted to maintain their outlet pressure at the same pressure as the control pressure.

8. A system in accordance with claim 4, including a solenoid-actuated valve in said delivery line downstream of said confluence, said valve being actuated by said pressure responsive switch.

9. A system in accordance with claim 4, wherein said upstream regulator has an inlet and outlet for connecting said regulator in said supply line, and includes a regulator portion for maintaining its outlet pressure at the same pressure as the control pressure; and a relief portion for venting gas from the line connected to said outlet when said outlet pressure rises above said selected level.

10. A system in accordance with claim 9, wherein said upstream regulator includes a regulator portion and a pressure relief portion, and a pair of poppet valves respectively mounted in said regulator and relief portions, said poppet valves being actuated by a diaphragm pressurized on alternate sides by said control and outlet pressures; opening of one of said poppets by displacement of said diaphragm in one direction effecting said flow of supply gas to said outlet, and opening of said other poppet valve by movement of said diaphragm in the opposite direction effecting said venting from said outlet.

11. A system in accordance with claim 10, wherein said poppets are opposed, and actuated to unseat by displacement of said diaphragm, said diaphragm being mounted therebetween.

12. A system in accordance with claim 9, wherein said downstream regulator includes an inlet and an outlet and a movable poppet valve therebetween, said poppet valve being urged to a position to stop the flow from said inlet by domeloading control pressure applied at one end of said poppet, and urged to an open position permitting flow to said outlet by regulated inlet pressure at the opposite end of said poppet; and said regulator including internal spring biasing means acting co-directionally with said inlet pressure, whereby said inlet pressure is held to a set value below said control loading pressure in accordance with the force provided by said biasing spring.

13. A system in accordance with claim 9, wherein said pressure responsive switch includes a cylinder and a displaceable piston; said piston being biased at one end by said control pressure and at the opposite end by a spring and said accumulator pressure; and a microswitch, constituting the circuit closing element in said pressure responsive switch, being actuated by displacement of said piston due to unbalancing of the opposing forces thereon.

14. A system in accordance with claim 13, wherein said spring compression is adjustable to yield a desired biasing level.

* * * * *